United States Patent Office 3,389,241
Patented June 18, 1968

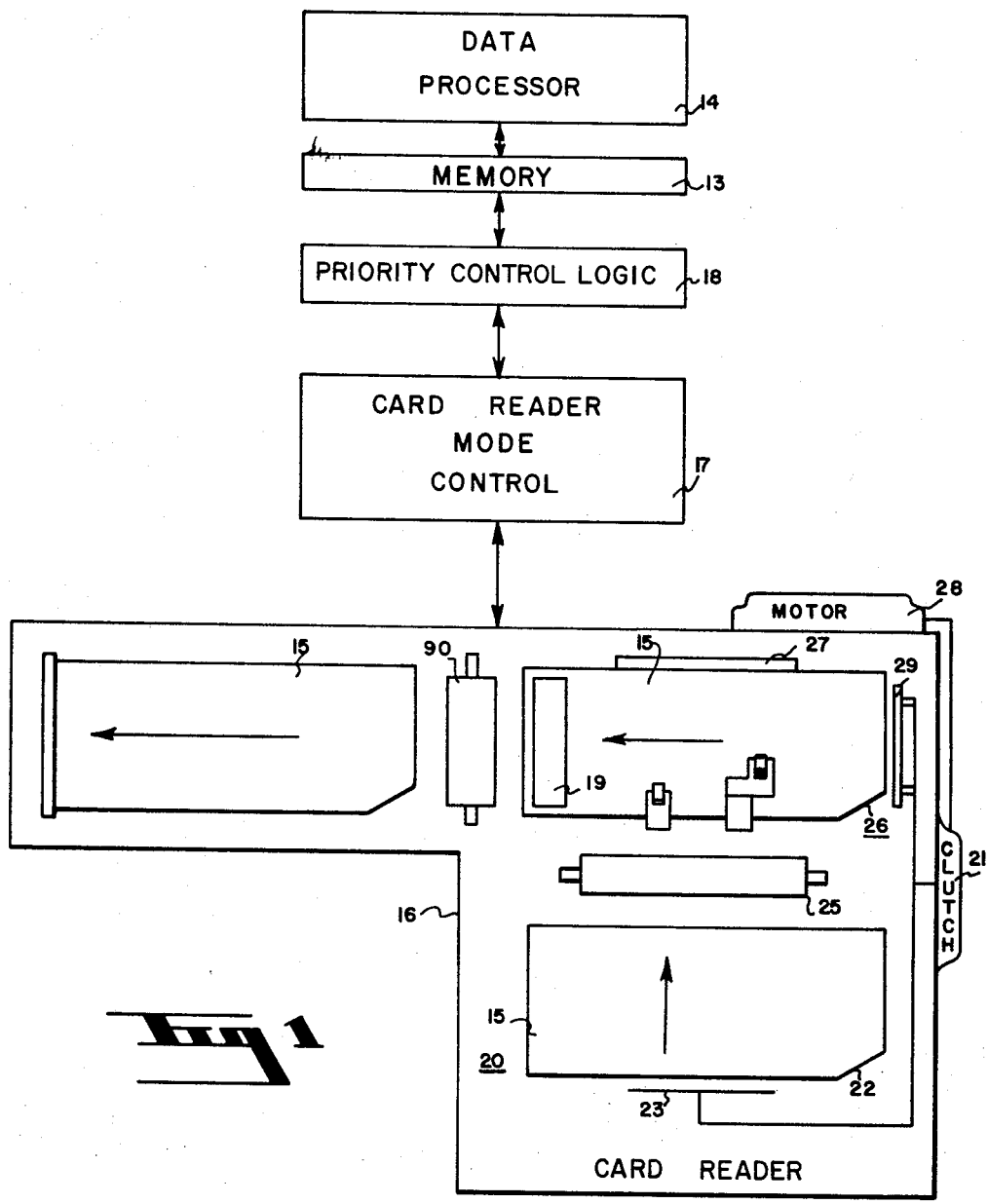

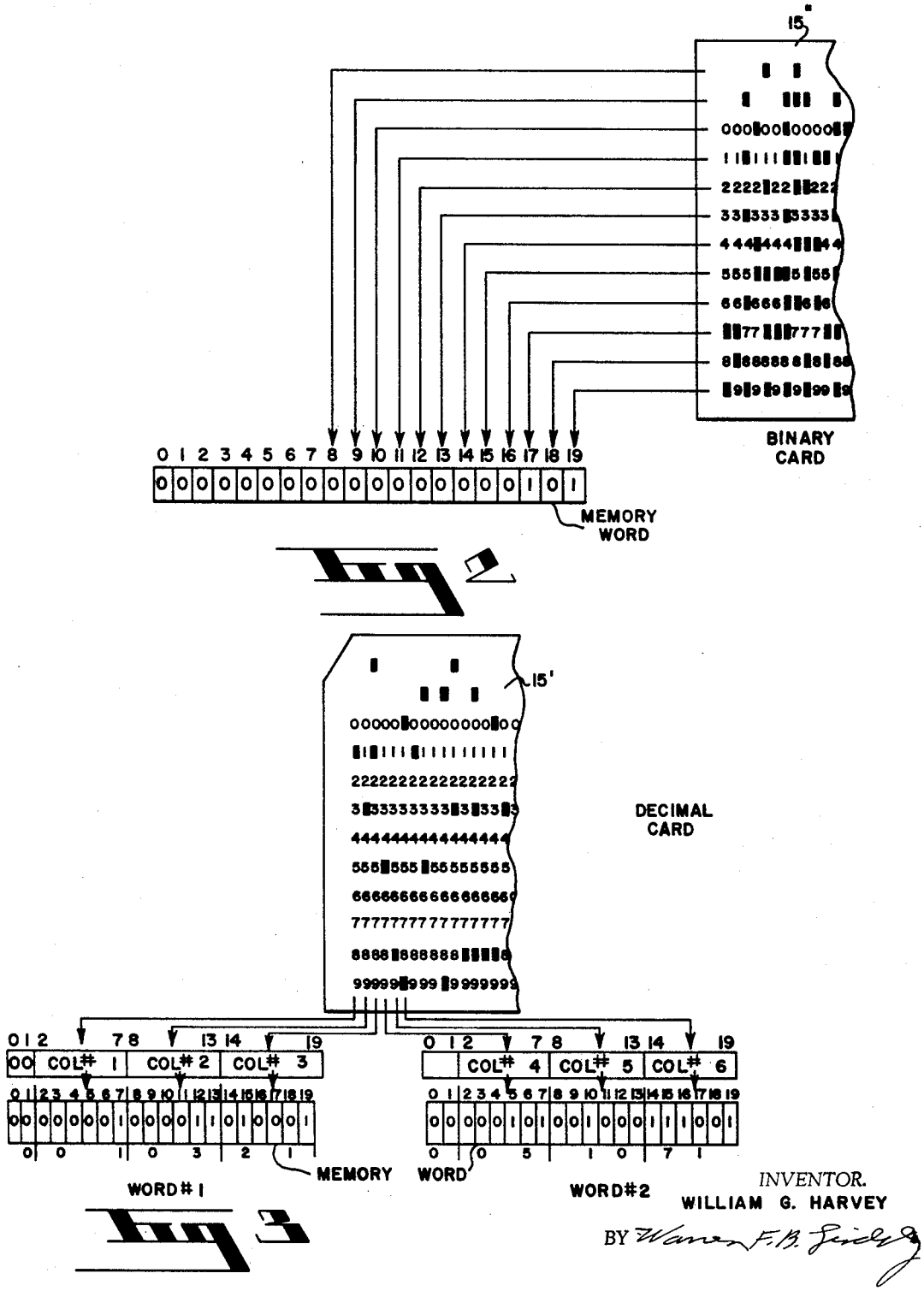

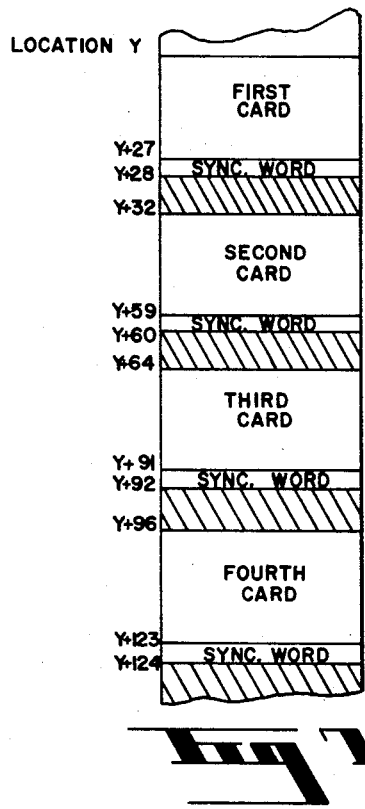
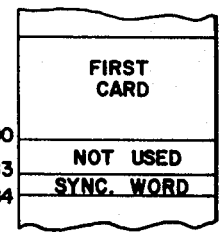
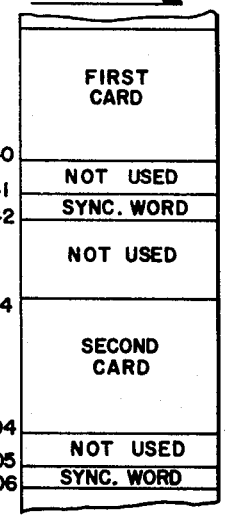

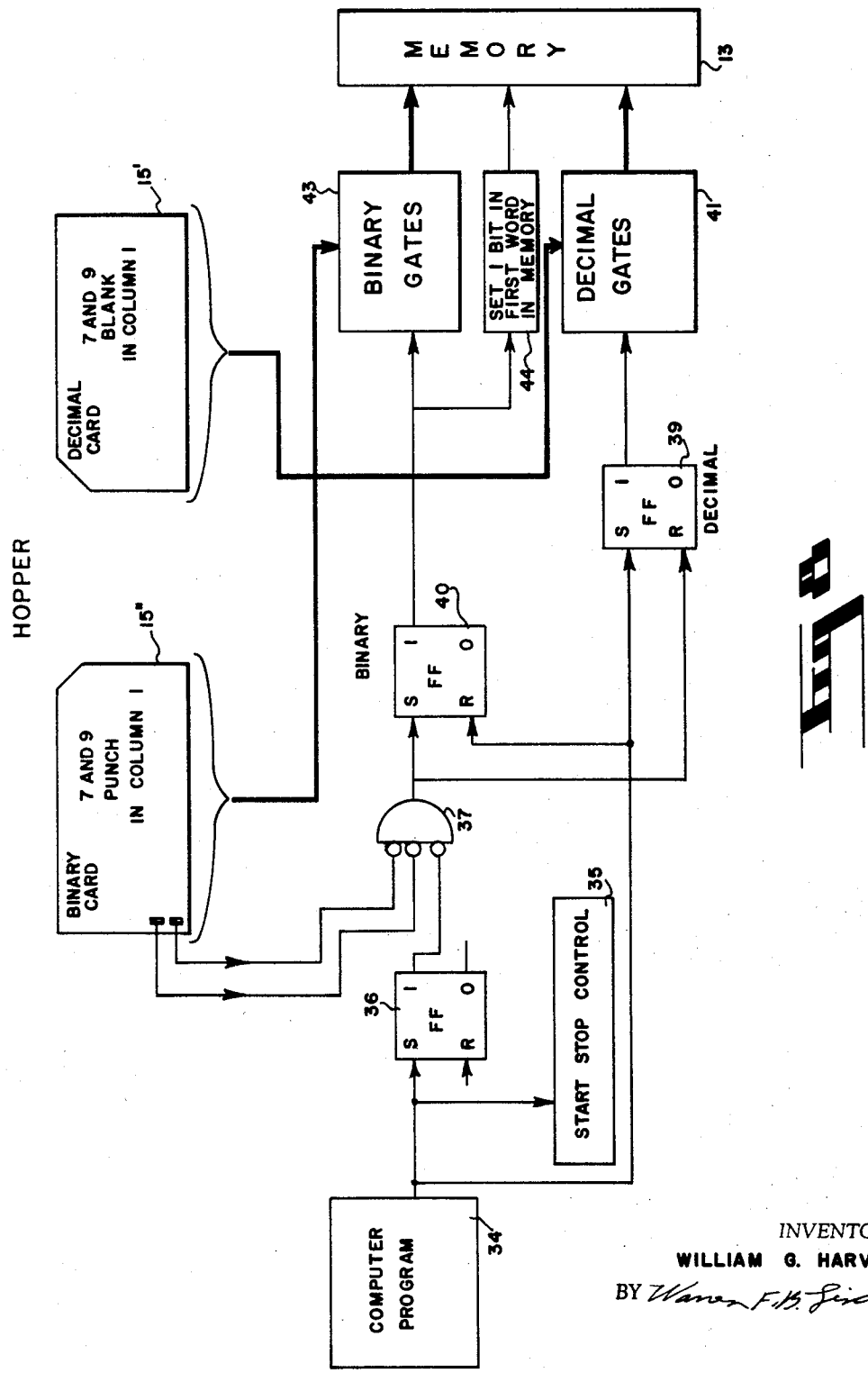

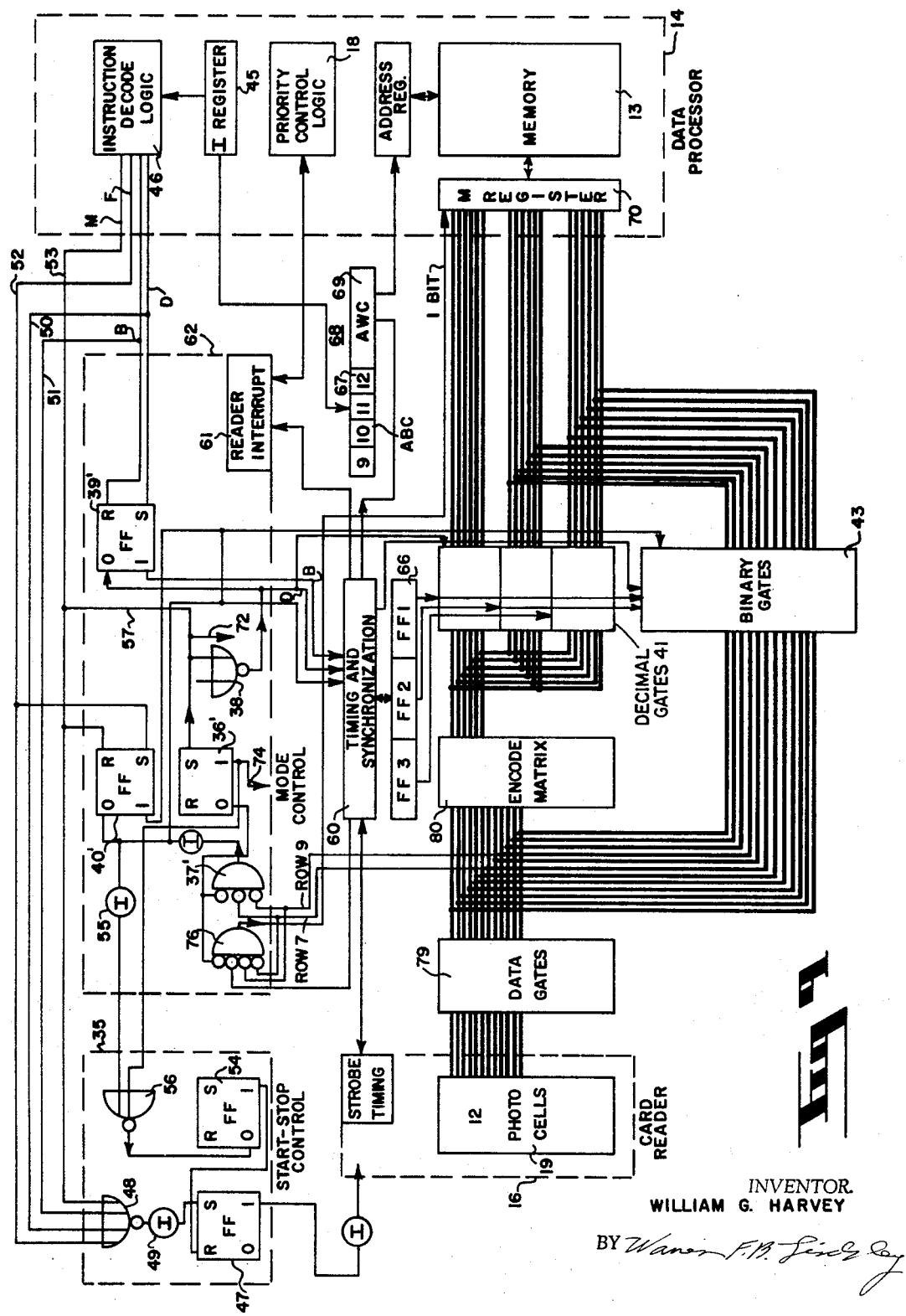

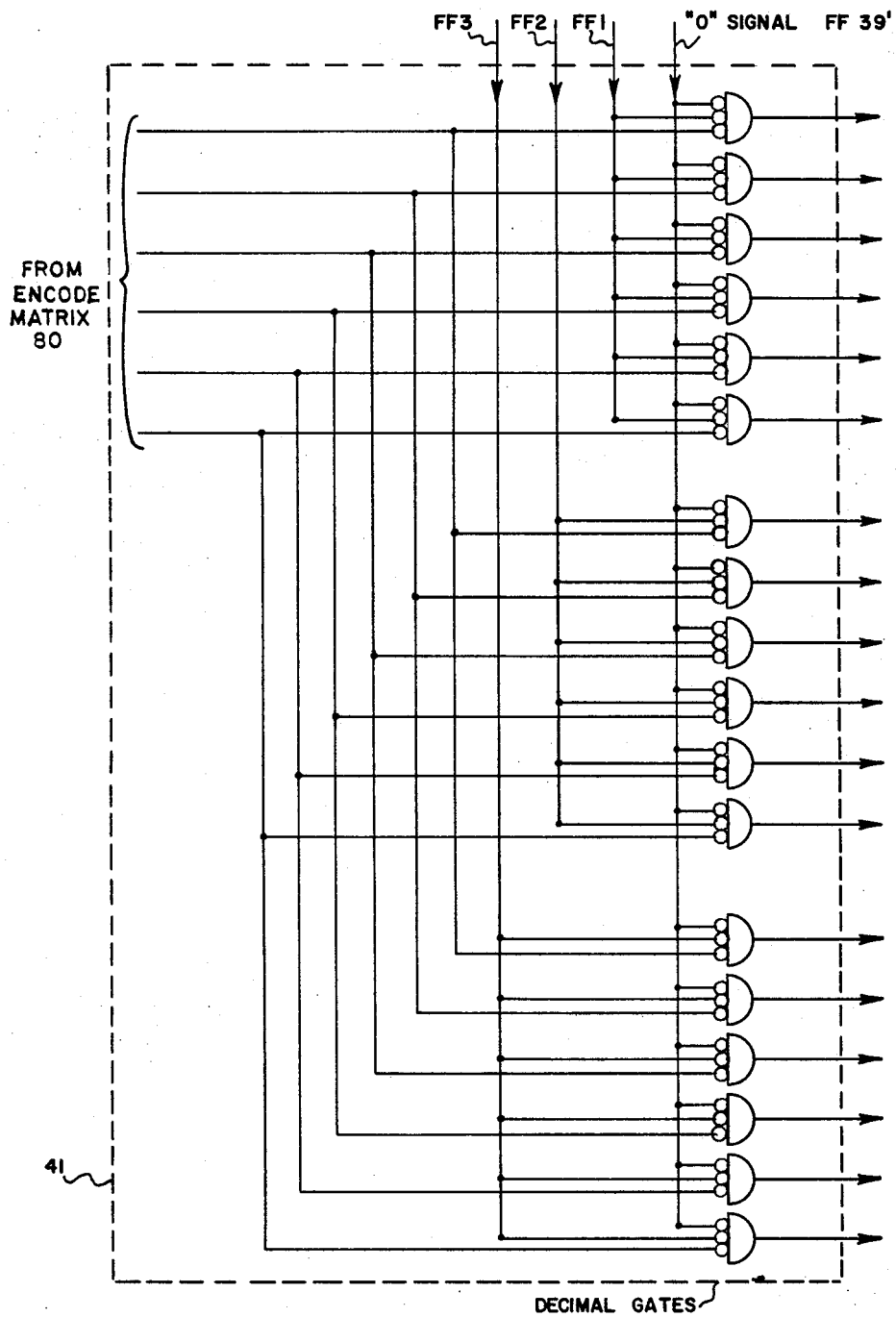

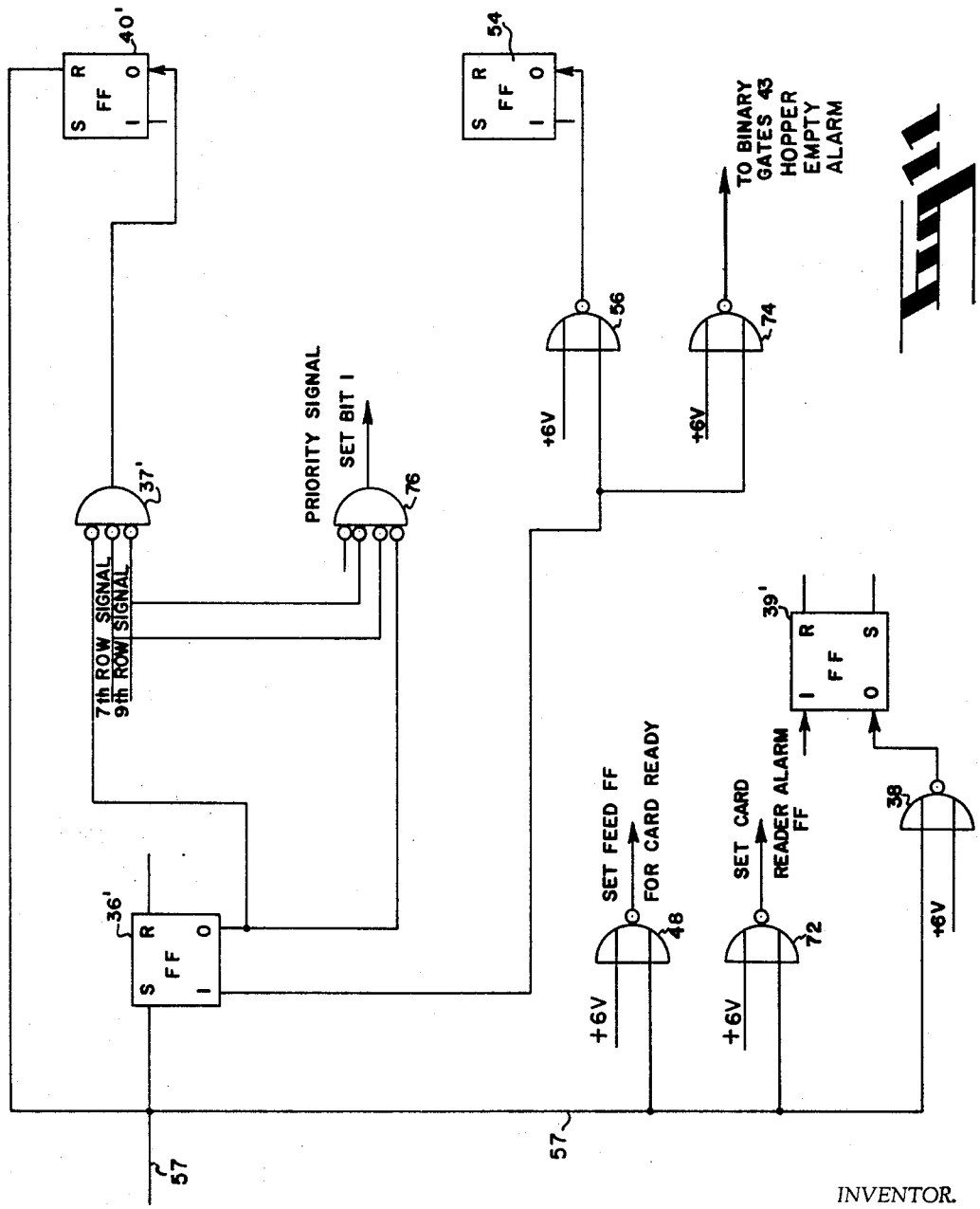

3,389,241
SYSTEM FOR READING INFORMATION FROM INTERMIXED BINARY AND DECIMAL CARDS
William G. Harvey, Glendale, Ariz., assignor to General Electric Company, a corporation of New York
Filed Nov. 27, 1963, Ser. No. 326,420
8 Claims. (Cl. 235—61.11)

ABSTRACT OF THE DISCLOSURE

A system for reading information from punched cards in response to a given program instruction wherein a Read Card Decimal instruction causes a reading operation in the decimal mode; a Read Card Binary instruction causes a reading operation in the binary mode and a Read Card Mixed instruction causes the system to read each card in the decimal mode unless a punched hole in the 7th and 9th row position of the first column of the card is read and in that instance reads that card in the binary mode.

---

This invention relates to systems for reading coded information and more particularly to means for reading a stack of intermixed punched cards which have either binary or decimal coded information stored on them and then transmitting the information read column by column to a date processor.

In high speed data processing systems widely used today, it is necessary that the information processed by the system be supplied from an external source. This external source of information may be supplied to the data processor from suitable information bearing mediums such as magnetic tapes, thermoplastic recording tapes, documents bearing magnetic ink imprints and punched cards.

One of the present day standard punched cards stores data in the form of holes punched in predetermined positions in a matrix of 80 vertical columns and 12 horizontal rows. A hole may be punched at the intersection of any column or row. The columns are customarily consecutively numbered one through 80, beginning at the leading edge of the card and the rows are customarily numbered reading from the top to the bottom of the card as follows:

12, 11, 0, 1, 2, 3, 4, 5, 6, 7, 8, 9

The information recorded in the form of punched holes may be read column by column starting with column 1 and reading each succeeding column having information stored in any row position of the column.

The information stored on punched cards may be represented in any arbitrary code with any arbitrary combination of holes punched in a given column representing any desired symbol such as a numerical or alphabetical character or other symbol. Many different codes are in common use for punched card recordings, but one commonly used code is the standard Hollerith code known as a decimal code which utilizes only ten of the twelve rows for storing a decimal digit in a given column and all twelve rows for storing other characters such as letters of the alphabet and special characters. Another commonly used code for storing all forms of information is the binary code which may be punched on the twelve row and eighty column cards described above.

Since it is desirable to use one or more binary coded cards between batches of a deck of decimal coded cards for providing the program of a data processor with instructional information for processing the following batch of decimal cards, a new and improved card reader has been provided which reads randomly intermixed binary and decimal cards.

Accordingly, an object of this invention is to provide a new and improved system for reading information from an information bearing medium.

Another object of this invention is to provide a new and improved system for reading punch cards.

A further object of this invention is to provide a new and improved system for automatically reading randomly intermixed binary or decimal coded punched cards without human intervention.

Other objects and advantages of the present invention will be apparent from the following specification taken in conjunction with the accompanying drawings.

In accordance with the invention claimed, a new and improved system is provided for reading information representing a plurality of different codes from an information bearing medium and translating the information read as the medium is fed past a reading station. A first flip-flop and gate combination is used for controlling the transfer of one type of coded information read from the medium and a second flip-flop and gate combination is used for controlling the transfer of another type of coded information read from the medium. Upon the reading of a given coded condition, one of the flip-flop gate combinations is disabled and the other flip-flop gate combination is enabled and vice versa, thereby effecting transfer of the information through given flip-flop gate combinations depending on the type of coded information read.

FIG. 1 is a block diagram of an information processing system embodying the invention;

FIG. 2 is a partial view of a standard eighty column, twelve row punch card showing the information punched in binary code with the read intermixed card instruction punched in rows 7 and 9 of column 1, and a diagrammatic illustration of the transfer from the card of such information to given bits of a word in memory of the data processor;

FIG. 3 is a partial view of a standard eighty column, twelve row punch card showing the information punched in decimal code and a diagrammatic illustration of the transfer from the card of such information to given bits of two words in memory of the data processor;

FIG. 4 is an illustration of the significant bit positions in a read card instruction word;

FIG. 5 illustrates diagrammatically a block of memory cores utilized in the reading into memory of one 12-row binary card;

FIG. 6 illustrates diagrammatically a block of memory cores utilized in reading into memory two 10-row binary cards;

FIG. 7 illustrates diagrammatically a block of memory cores utilized in reading into memory four decimal cards;

FIG. 8 is a simplified diagrammatic illustration of the intermixed punch card reader features of the information processing system shown in FIG. 1;

FIG. 9 is a detailed block diagram of the information processing system shown in FIGS. 1 and 8;

FIG. 10 is a diagramatic illustration of the details of the decimal gates illustrated in FIGS. 8 and 9 showing the enabling and gating signals; and FIG. 11 is a schematic diagram of a portion of the circuit used to implement the Read Card Mixed instruction.

Referring more particularly to the drawings by characters of reference, FIG. 1 discloses an information processing system wherein a memory 13 associated with a data processor 14 receives information from a plurality of punched cards 15 which are read by a serial card reader 16. In accordance with the claimed invention, the information processing system is improved in a new and novel manner through the use of a binary and decimal card reader control 17 which renders the system capable of reading randomly mixed cards having either binary or decimal coded information punched on them. The information is read into memory 13 under the control of priority logic 18.

The card reader

Card reader 16 may be any one of the serial card readers known to those skilled in the art and is illustrated schematically in FIG. 1 to show the relative positions of the various major components of such a device. Since the card reader is a mechanical device, synchronizing signals may be conveniently derived from it. Accordingly, synchronization of the transfer of data in the card reader 16 to the data processor 14 may be accomplished by means of photoelectric timing devices mechanically synchronized with the movement of the card over a reading station 19. In FIG. 1, reading station 19 of card reader 16 comprises twelve photocells and twelve lamps (not shown). The lamps are mounted above the photocells which are embedded in a block and masked by a plate having only a narrow slot above each photocell. The lamps, the slots in the mask, and the centers of the photocells may be vertically aligned. Reference is made to United States patent application, Ser. No. 175,873, filed by C. R. Johnson and C. H. Propster, Jr. on February 21, 1962, now U.S. Patent No. 3,173,000, issued March 9, 1965, entitled "System for Synchronizing Punched Card Readers" and assigned to the assignee of this invention, for a complete disclosure of one known card reader and particularly of a photoelectric timing device which may be used in the transfer of data from card reader 16 to data processor 14.

As shown in FIG. 1, a card hopper 20 is arranged to hold a stack of cards to be read. A solenoid (not shown) is momentarily energized to selectively engage a single-revolution clutch 21 for one complete revolution in response to which a feed table 22 having a picker knife edge 23 pushes the bottom card of a stack in card hopper 20 to a driven roller 25 which transfers the card onto a sensing platform 26 having a rest bar or guide rail 27. A motor 28 drives the usual gear trains, linkages and pulleys (not shown) needed for moving the various parts of the card reader structure.

When clutch 21 is actuated for a single revolution, a card is caused to be fed from hopper 20 onto the sensing platform 26. A cam (not shown) causes a feeding arm or pusher 29 to advance the card on the sensing platform to the reading station 19. As the feed arm 29 advances the card to the reading station 19, a suitable leading edge detector of the photoelectric timing devices is utilized for synchronizing the reading and transfer of data from the card to the data processor.

Card formats

FIGS. 2 and 3 illustrate partial views of standard eighty column, twelve row punch cards showing the information punched in binary code on the card in FIG. 2 and the information punched in Hollerith or decimal code on the card in FIG. 3. In the illustrations, the recorded punched data is represented by the black rectangular impressions at the intersection of the various rows and columns. The twelve rows are divided into two areas, zone and numeric. The zone area consists of rows 12, 11 and 0, and the numeric area consists of rows 0 through 9. Row 0 is common to both zone and numeric areas.

In the 12-row binary mode of representation as illustrated in FIG. 2, all 12 punching positions of the card are used. The data appears on the card exactly as it will be stored in memory. A punch impression represents a binary 1 and no punch impression represents a binary 0. Because one memory location contains data from only one card column, one card will fill eighty memory locations. The 12 punching positions occupy the 12 least significant bits of the memory word, namely, bits 8 through 19. Bits 0 through 7 do not contain data and are automatically set to zero. FIG. 2 also illustrates the memory word equivalent of the data of a 12-row binary column.

In the 10-row binary mode of representation, a card similar to the one shown in FIG. 2 is used except that only card rows 0 through 9 are used. Two card columns will fill the 20 bit memory word shown in FIG. 2. Thus, one card may fill up to 40 memory locations. Data from the first column is read into bits 0 through 9 of a specified location and data from the second column is read into bits 10 through 19 of the same location. When using this mode of operation, the first card column of the pair required to fill one memory location (always an odd-numbered column) is considered to be the most significant of the two. The second column (always an even-numbered column) is considered to be the least significant of the two.

Data in the alphanumeric format is in the Hollerith code shown in FIG. 3 and can represent the 26 letters of the alphabet, the numerals 0 through 9, 28 special characters and punctuation marks, and blank spaces. Numerals are represented by a single punch per column. Alphabetics are represented by two punches per column, a zone punch and a numeric punch. Special characters consist of either two or three punches per column. The Hollerith code is read off of the cards and converted to binary coded decimal (BCD) before placing the data in memory in the same binary arrangement as the data read from the binary cards.

Since each column of the card shown in FIG. 3 contains a single character, each card can hold 80 characters. As alphanumeric data is read, each character is converted into a 6-bit BCD code for reading into memory. Thus, three card columns, each containing one character, make up one memory word. Data from the first card column is read into bits 2 through 7 of the specific memory location, data from the second card column is read into bits 8 through 13 and data from the third card column is read into bits 14 through 19 of this memory location. The unused bits 0 and 1 are always zeros in the data field. One card can occupy a maximum of 27 memory locations, although the 27th location is not completely filled because it contains data from only two card columns (columns 79 and 80). The unused portion of this memory location (bits 14 through 19) is automatically filled with blanks. FIG. 3 illustrates the memory word equivalents of the data of six columns of a decimal or Hollerith card.

The following table provides a list of alphanumeric characters and other symbols and their representation in Hollerith and BCD codes:

| Character | Hollerith (Row Punches) | BCD (Octal) | BCD in Memory |
|---|---|---|---|
| 0 | 0 | 00 | 000000 |
| 1 | 1 | 01 | 000001 |
| 2 | 2 | 02 | 000010 |
| 3 | 3 | 03 | 000011 |
| 4 | 4 | 04 | 000100 |
| 5 | 5 | 05 | 000101 |
| 6 | 6 | 06 | 000110 |
| 7 | 7 | 07 | 000111 |
| 8 | 8 | 10 | 001000 |
| 9 | 9 | 11 | 001001 |
| # | 3-8 | 13 | 001011 |
| @ | 4-8 | 14 | 001100 |
| (Underline) | 5-8 | 15 | 001101 |
| = | 6-8 | 16 | 001110 |
| + | 12 | 20 | 010000 |
| A | 12-1 | 21 | 010001 |
| B | 12-2 | 22 | 010010 |
| C | 12-3 | 23 | 010011 |
| D | 12-4 | 24 | 010100 |
| E | 12-5 | 25 | 010101 |
| F | 12-6 | 26 | 010110 |
| G | 12-7 | 27 | 010111 |
| H | 12-8 | 30 | 011000 |
| I | 12-9 | 31 | 011001 |
| +0 | 12-0* | 32 | 011010 |
| . | 12-3-8 | 33 | 011011 |
| ☐ | 12-4-8 | 34 | 011100 |
| - | 11 | 40 | 100000 |
| J | 11-1 | 41 | 100001 |
| K | 11-2 | 42 | 100010 |
| L | 11-3 | 43 | 100011 |
| M | 11-4 | 44 | 100100 |

| Character | Hollerith (Row Punches) | BCD (Octal) | BCD in Memory |
|---|---|---|---|
| N | 11-5 | 45 | 100101 |
| O | 11-6 | 46 | 100110 |
| P | 11-7 | 47 | 100111 |
| Q | 11-8 | 50 | 101000 |
| R | 11-9 | 51 | 101001 |
| −0 | 11-0* | 52 | 101010 |
| $ | 11-3-8 | 53 | 101011 |
| * | 11-4-8 | 54 | 101100 |
| Space | Blank | 60 | 110000 |
| / | 0-1 | 61 | 110001 |
| S | 0-2 | 62 | 110010 |
| T | 0-3 | 63 | 110011 |
| U | 0-4 | 64 | 110100 |
| V | 0-5 | 65 | 110101 |
| W | 0-6 | 66 | 110110 |
| X | 0-7 | 67 | 110111 |
| Y | 0-8 | 70 | 111000 |
| Z | 0-9 | 71 | 111001 |
| , | 0-3-8 | 73 | 111011 |
| % | 0-4-8 | 74 | 111100 |
| ( | 0-5-8 | 75 | 111101 |
| ) | 0-6-8 | 76 | 111110 |
| ↑ Not Assigned ↓ | 2-8 | 12 | 001010 |
| | 7-8 | 17 | 001111 |
| | 12-5-8 | 35 | 011101 |
| | 12-6-8 | 36 | 011110 |
| | 12-7-8 | 37 | 011111 |
| | 11-5-8 | 55 | 101101 |
| | 11-6-8 | 56 | 101110 |
| | 11-7-8 | 57 | 101111 |
| | 0-2-8 | 72 | 111010 |
| | 0-7-8 | 77 | 111111 |

*Card reader instructions*

The data processor 14 is a stored program, general purpose digital computer which operates primarily in a straight binary mode but processes both alphanumeric and binary information. The programs to be executed and the data to be immediately operated upon are stored in memory 13 formed of, for example, a plurality of magnetic cores wherein each core, depending on direction of magnetization, represents a binary digit (bit) of an instruction or data word.

The card reader is an on-line input device used to read punched card information into thte memory associated with the data processor. Information may be recorded on these cards in either binary or decimal codes as mentioned heretofore. The interpretation of the data punched on the cards is determined by the particular mode of the "read card" instruction executed by the program of the data processor 14.

FIG. 4 illustrates the significant bits of a particular read card instruction word executed by the data processor described herein. The instructions of the particular data processor disclosed herein dealing with the described card reader has an operation code (bits 0 through 4) of 10101 (25 in octal). This code designation is used with all input-output, test and branch, and data transfer instructions. Bits 5 and 6 of the instruction word are reserved for designation of address modifications and bits 7 and 8 indicate whether it is an input-output or a test and branch instruction.

Regardless of the mode of the data, the starting address in memory into which data is read is disclosed herein as being a multiple of 128 but no greater than 1024. The required memory address is indicated by the use of bits 9 through 12 of the instruction word wherein a one in bit 12 will indicate the memory block starting with address 128, a one in bit 11 will indicate the memory block starting with adddres 256, a one in bit 10 will indicate the memory block starting with address 512, and a one in bit 9 will indicate the memory block starting with address 1024. Bits 13, 14 and 15 always contain zeros and bits 16 through 19 indicate the specific read mode instruction.

When reading a 12-row binary card by the system disclosed herein, information will be read into memory locations starting with the starting address designated in the instruction word and herein referred to as Y. The 12 punching positions of each column of the punch card starting with column 1 are placed in the 12 least significant bit positions of successive memory locations. As illustrated in FIG. 5, the data of the first card is read into memory location Y through Y+79. with this instruction, the first three memory locations following the last data word are not used. A synchronization word (sync word) is placed in the fourth memory location following the last data word (Y+83) and its sign bit is set to 1 after the card has been completely read. Bit pisition 1 of the synchronization word is set to 1 when a card reader instruction causes the input hopper to go empty.

If a 10-row binary card is read by the system disclosed, the 10 punching positions of the first column are read into bits 0 through 9 of a specified memory location and data from the second column is read into bits 10 through 19 of the same memory location. As illustrated in FIG. 6, the data from the first card is read into memory locations Y through Y+39 and the data from the second card is read into memory locations Y+64 through Y+103. The data from the third card is read into the same memory locations as the first card, namely, memory locations Y through Y+39. With this instruction, the first memory word following the last data word Y+40 and Y+104 is not used. The synchronization word (sync word) is the second memory word following the last data word Y+41 and Y+105 and its sign is set to minus after the card has been completely read into the memory area preceding it. Bit position 1 of the synchronization word is set to 1 when a card read instruction causes the input hopper to go empty.

When reading decimal cards by the system disclosed, the rata of the first card enters memory locations Y through Y+26, the data of the second card enters memory locations Y+32 through Y+58, the data of the third card enters memory locations Y+64 through Y+90, and the data from the fourth card enters memory locations Y+96 through Y+122. FIG. 7 illustrates diagrammatically a block of memory cores utilized in reading into memory four decimal cards. The data of the fifth card enters the same memory location as the first card (Y through Y+26). After each card is read, the sign bit of the synchronization word (sync word) which is the first memory word after the last card data word (Y+17, Y+59, Y+91, or Y+123) is set to minus. When a card read instruction causes the input hopper to go empty, a 1 bit is placed in bit position 1 of the synchronization word. Five words of memory including the synchronization word are automatically skipped after the areas containing card data. The last four locations of each skipped group may be used by the programmer for storage of constants or other program data.

The presence or absence of certain conditions within the card reader changes the status of specific bits in the synchronization words. By examining specific bits in the synchronization words, the programmer can identify the particular conditions that occurred during the card reading operation such as the condition of the hopper, timing errors, invalid characters, etc.

The following chart indicates the contents of various bit positions of the synchroniziation word and the operating condition in the card reading system represented by these bits.

| Bit Position | Contents | Operating Condition |
|---|---|---|
| 0 | 0 | Card not yet completely read into memory. |
| 0 | 1 | Card is completely read into memory. |
| 1 | 0 | Input hopper contains cards. |
| 1 | 1 | Input hopper is empty. |
| 16 | 0 | Output stacker is full or feed plate is latched. |
| 16 | 1 | Output stacker is not full and feed plate is not latched. |
| 17 | 0 | Invalid characters exists. |
| 17 | 1 | All characters are valid. |
| 18 | 0 | Synchronization (timing) error exists on card read. |
| 18 | 1 | No synchronization (timing) error exists. |
| 19 | 0 | Input hopper is empty and end of file switch is set. |
| 19 | 1 | Input hopper is not empty and end of file switch is not set. |

The programmer through the use of various mode instructions may have executed various types of card reading operations. Some of these mode instructions are identified below with the particular bit designations used for positions 16, 17, 18 and 19 of the instruction word.

| Mode Instructions | Bit Positions | | | |
|---|---|---|---|---|
| | 16 | 17 | 18 | 19 |
| Read Card Decimal (RCD) | 0 | 0 | 0 | 0 |
| Read Card Binary (RCB) | 0 | 0 | 0 | 1 |
| Halt Card Reader (HCR) | 0 | 1 | 0 | 0 |
| Read Card Full (RCF) | 1 | 0 | 0 | 0 |
| Read Card Mixed (RCM) | 1 | 0 | 1 | 0 |

When a Read Card Decimal (RCD) instruction is received by the card reader from the program of the data processor 14, four cards are sequentially read into memory in the decimal mode with the data from each card occupying 27 memory locations plus one memory location for the synchronization word. If the card reader contains more than four cards and the RCD instruction is not followed by the command to halt, the fifth card is automatically read into the same memory location Y as the first card. The sixth card enters the same memory location Y+32 as the second card, etc. If the card reader is not in a ready status when the RCD instruction is given, the central processor halts and the card reader echo alarm lights on the operator's console to indicate an error. Once begun, card reading is continuous until the card reader is stopped by either a Halt Card Reader instruction, an empty input hopper condition or a machine malfunction.

When a Read Card Binary (RCB) instruction is received by the card reader from the program of the data processor, cards punched in the 10-row binary format are read into memory, starting with the first card at memory location Y and continuing through memory location Y+39. The second card is read into memory locations Y+64 through Y+103.

When a Read Card Full (RCF) instruction is received by the card reader from the program of the data processor, cards punched in the 12-row binary format are read into memory starting at location Y. The 12 punch positions of each column of the 12-row binary card, starting with column 1, are placed in the 12 least significant bit positions of successive memory locations. The data of the first card is read into memory location Y through Y+79. The card reader automatically halts after one card is read. If another card is to be read, another RCF instruction must be given.

In accordance with the invention disclosed, when a Read Card Mixed (RCM) instruction is obtained from the program of the data processor, the card reader is instructed to read the following card which may be either a binary or a decimal card as the case may be in a given manner. In this mode of operation, the card reader automatically halts after each card is read. If another randomly intermixed binary or decimal card is to be read, another RCM instruction must be given.

When the Read Card Mixed instruction is used, cards in the binary format must contain a punch in the 7th and 9th row positions of the first column. If the card reader does not detect punch holes in 7th and 9th rows of column 1 of the card being read, it assumes that the card is in the decimal or alphanumeric format and reads it as such into memory. The first word in memory of a card coded in a binary format with punch holes in rows 7 and 9 of column 1 would appear with a bit 1 in position 1. This bit 1 in position 1 of the first word in memory is placed there by the logic of the system indicating that the first column of a binary card was read under an RCM instruction.

System design

FIG. 8 is a simplified diagrammatic illustration of the intermix card reading features of the information processing system shown in FIG. 1. If the data processor 14 through its stored computer program illutrated as being in block 34 executes a Read Card Mixed (RCM) instruction, a start-stop control mechanism 35 associated with card reader 16 is actuated causing the reading of only one card per instruction word from the data processor. The RCM instruction directs the reading of the information on the next binary or decimal card, as the case may be, into the memory locations specified in the instruction word. At the same time that the start-stop control mechanism 35 is actuated, a read card mixed flip-flop 36 is set and a signal is transmitted to one of the terminals of AND-gate 37. At the same time that the start-stop control mechanism 35 is actuated, a signal is transmitted to set a decimal mode flip-flop 39. The RCM signal, in addition to setting flip-flops 36 and 39, also resets a binary mode flip-flop 40. Thus, the system is initiated upon each Read Card Mixed instruction to read decimal cards.

Punch cards 15' and 15" representing decimal and binary cards, respectively, are shown as being in the hopper of card reader 16. Although FIG. 8 shows cards 15', 15" spacedly positioned with each card having a separate data flow path to a different plurality of gates, it should be understood that this arrangement is shown merely for purposes of simplicity and that in actual practice, the cards are read at the same reading station and information is transmitted through one data flow path, as shown in FIG. 9, simultaneously to both the binary and decimal gates.

If decimal card 15' is transferred from the hopper to the reading station 19 under a Read Card Mixed instruction, each column of the card will be sequentially read and signals will be generated representing this information which will be encoded and transferred to a plurality of decimal gates 41. Since the Read Card Mixed instruction sets flp-flop 39 and enables gates 41, the information read from cards 15' and transmitted to gates 41 will be gated into memory 13 by suitable timing and synchronizing signals from the card reader.

Binary gates 43 are arranged to receive sequentially colum by column the information read by card reader 16 from the binary cards. If card 15", representing a binary card, is transferred from the hopper to the reading station 19 under a Read Card Mixed instruction and the card contains punches in the 7th and 9th rows of the first column, signals will be generated by these 7th and 9th holes of column 1 which will enable AND-gate 37. A signal produced by the enabling of AND-gate 37 resets decimal flip-flop 39 and sets the binary flip-flop 40.

The setting of binary flip-flop 40 and other suitable timing and synchronizing signals from the card reader enables binary gates 43, causing the information read to be transferred through gates 43 and read into memory 13.

At the time of transferring the information read from the first column of the binary card to memory, a 1 bit is set in the first word placed in memory by logic circuits shown in block 44. This 1 bit indicates that a binary card has been read under a Read Card Mixed instruction.

For a more detailed illustration of the information processing system shown in FIGS. 1 and 8, reference is made to FIG. 9.

The logic diagrams illustrated in FIG. 9, contrary to those shown in FIG. 8, employ output signals having two voltage levels wherein the voltage level representing a binary digit one is chosen to be zero volts and the voltage level which represents the binary digit zero is chosen to be a +6 volts. Accordingly, the binary complements of the binary one and zero's are zero and one, respectively, and are represented by the respective levels of, for example, +6 volts and zero volts. Whether a given signal represents a true binary digit one or its complement depends upon its position or level in a given logic diagram. For instance, a +6 volt signal which represents a binary zero at an input terminal of an inverter appears at the output terminal of an inverter as a zero volt signal representing a binary one.

As illustrated in FIGS. 9 and 11, the circuit elements employed to provide the gating functions inherently provide an inverting or complementing action. Logic circuits which embody inverting operations as shown herein are generally referred to as NOR circuits.

In the NOR circuits shown in FIGS. 9 and 11, the NOR gates are devices adapted to receive two or more input signals, each representing a binary digit and deliver a binary digital output signal representing a binary one only when all input signals represent a binary zero.

For more detail of this type of logic, reference is made to United States patent application, Serial No. 191,573, filed May 1, 1962, by David W. Masters, now U.S. Patent 3,239,819 issued Mar. 8, 1966, entitled, "Priority Arrangement," and assigned to the assignee of this invention.

In FIG. 9 an instruction register 45 of the data processor 14 is arranged to receive and hold the instruction word during execution of a computer command. When a Read Card instruction is decoded by the instruction decode logic in block 46, a "command pulse" is sent to the start-stop control logic in block 35 to set a clutch flip-flop 47. This zero volt pulse representing a binary one is transmitted to clutch flip-flop 47 through a NOR-gate 48 and an inverter 49 via conductors 50, 51, 52 and 53, depending on whether a Read Card Decimal, Read Card Binary, Read Card Full or Read Card Mixed mode instruction is decoded.

If the instruction word is decoded as either a Read Card Full or Read Card Mixed mode instruction, the command pulse for setting the clutch flip-flop 47 also sets a stop flip-flop 54 which causes only one card per instruction word to be read. The setting of the stop flip-flop 54 for a Read Card Full instruction occurs through the setting of the binary mode flip-flop 40' which transmits a binary zero signal from its "0" output terminal through an inverter 55 where it is complemented and applied as a binary one signal to NOR-gate 56. The output terminal of NOR-gate 56 transmits a binary zero signal to the "0" output terminal of the stop flip-flop 54, thereby setting flip-flop 54 and resetting flip-flop 47 after a delay time interval. The output signal from terminal "1" of flip-flop 54 is suitably delayed by means not shown until the clutch flip-flop 47 has energized the clutch solenoid (not shown) permitting one card to be fed into the reading station 19 of card reader 16. At this time, the clutch flip-flop 47 is reset so that only one card per instruction word will be read under a Read Card Full instruction. Under a Read Card Mixed instruction, flip-flop 36' is set via conductors 53 and 57 and transmits a binary one signal from the "1" output terminal of flip-flop 36' through NOR-gate 56 where it is complemented to a binary zero signal and applied to the "0" output terminal of flip-flop 54 to set it and to reset clutch flip-flop 47 in the same manner as described for the Read Card Full mode instruction.

About a 20 millisecond delay will occur after the energization of the clutch solenoid before the card moves into the reading station 19 at which time the leading edge of the card is sensed by timing and synchronization circuits in block 60. The timing and synchronization circuits will delay until the middle of the hole in the first column of the card being read (or the place where it would be if one is not punched in this column), and will then send a read pulse to the reader interrupt control logic in block 61 of the mode control block 62. The reader interrupt control logic in block 61 will then request priority of the control logic in block 18 of the data processor 14. When priority is granted and an acknowledging signal is transmitted back through the same path to the timing and synchronization logic in block 60, the information read from the column under the reading station 19 will be transmitted to memory under the control of a three-bit ring counter 66, well known in the art.

The starting address designated in the instruction word by bits 9 through 12 is transferred from the instruction register 45 to an address block counter (ABC) 67 of a register 68. As mentioned before, bit 12 has a binary value of 128, and therefore the address in the instruction must be a multiple of 128.

An address word counter (AWC) 69 comprising a portion of register 68 is provided to count up successive addresses for each card. A 10-row binary card will contain up to 40 words of information; a 12-row binary card will contain up to 80 words of information and a decimal card will contain up to 27 words of information. Upon the storing in memory of the information read from either binary or decimal cards, the address word counter 69 will be reset to zero. Each time two 10-row binary cards, one 12-row binary card or three decimal cards are stored in memory, the address block counter will be returned to zero. Thus, the selection of the addresses used in memory is controlled by the address block counter 67 and the address word counter 69 of register 68.

The mode instruction, namely bits 16 through 19 of the instruction word in the instruction register 45, is decoded by the instruction decode logic illustrated in block 46 of the data processor 14.

If the mode of operation identified by bits 16 through 19 of the instruction word decodes as Read Card Binary, a binary one signal is provided by the instruction decode logic 46 which resets flip-flop 49' in mode control block 62. If the instruction word decodes as Read Card Full, a binary one signal is transmitted through conductor 52 to set flip-flop 40' in block 62. If the instruction word decodes as Read Card Decimal, a binary one signal is provided to set flip-flop 39' in block 62. If the instruction word decodes as Read Card Mixed, a binary one signal is transmitted through conductors 53 and 57 to set flip-flop 36' in block 62.

If flip-flop 40' is set by a signal indicating that a Read Card Full mode instruction has been decoded, signals are transmitted from the "0" and "1" terminals of the flip-flop to the timing and synchronization logic in block 60 which sets the three bit counter 66 to operate as a single column counter for the 12-row binary card. At the same time, a binary one signal is transmitted from the "1" output terminal of flip-flop 40' to enable binary gates 43 causing the information read to be transmitted to the M register 70 and read into memory 13. If flip-flop 39' is reset by a binary one signal indicating that a Read Card Binary mode instruction (10-row binary card) has been decoded, the three bit counter 66 is set to operate as a two stage counter so as to read two columns into every memory word. If flip-flop 39' is set by a binary one signal indicating that a Read Card Decimal instruction is to be executed, a binary zero signal is transmitted from the "0" terminal of flip-flop 39' through the logic in the timing and synchronizing block 60 to the three bit counter 66 causing three columns of the decimal card being read to be placed in M register 70 and read into one word in memory.

When a Read Card Mixed mode instruction is decoded, the signal which sets flip-flop 36' in mode control block 62 also enables NOR-gate 38 which transmits a signal to raise the potential of the "0" terminal of flip-flop 39' to its high state. This action sets flip-flop 39' and places it in a decimal reading mode. Thus, when a Read Card Mixed command is provided by the program of the computer, cards will always be read in the decimal mode unless, as explained hereafter, a 7 and 9 row punch is read in column 1 of the card being scanned. FIG. 10 illustrates in detail decimal gates 41 and shows the connection of the enabling signal from flip-flop 39' as well as signals from the various flip-flops of the three bit counter 66.

The setting of flip-flop 36' also enables gate 37' which is arranged to be gated by the reading of a 7 and 9 punch in column 1 of the card being read. As explained before, the enabling of gate 37' sets the binary flip-flop 40' for reading a 12-row binary card through the binary gates 43 into memory 13. Simultaneously with the transfer of a binary one signal to flip-flop 36', upon the decoding of a Read Card Mixed command by the decode logic in block 46, a signal is transmitted through conductors 53 and 57 to NOR-gates 48 and 72 shown in FIG. 11. FIG. 11 illustrates in more detail a portion of the structure shown in FIG. 9 for implementing the Read Card Mixed instruction. NOR-gate 72 sets a flip-flop (not shown) in the card reader logic which controls the card reader alarm and NOR-gate 48 sets flip-flop 47 which controls the card feed to the card reader system.

The setting of flip-flop 36', as noted from FIG. 11, also enables a pair of NOR-gates 74 and 56. NOR-gate 74 is provided to place a 1-bit in bit position 1 of the sychronization word in memory indicating that the input hopper of the card reader is empty. NOR-gate 56 as stated before is provided to set flip-flop 54 to stop the operation of the card reader.

The "0" output terminal of flip-flop 36', when set, simultaneously enables gates 37' and 76. Gate 37', upon the reading of a hole in rows 7 and 9 punched in column 1 of the card being read, is enabled, thereby setting flip-flop 40'. Gate 76, upon the receipt of a priority signal from the timing and synchronization logic in block 60 and the signals from rows 7 and 9 of column 1 of the card being read is enabled, thereby providing a signal for placing a bit-1 in position 1 of the first word in memory indicating that the first column of the binary card being read was read under a Read Card Mixed instruction.

*System operation*

When an instruction word from the computer program is placed in the instruction register 45 of the data processor 14 and bits 0 through 4 have been decoded by the logic in block 46 indicating a card reader operation, a command pulse is sent to initiate the logic in mode control block 62. Flip-flops 36', 39' and 40' are set in the manner explained heretofore in accordance with the mode instruction of the instruction word. The command pulse sets the clutch flip-flop 47. The address block and word counters 67 and 69 and the three bit ring counter 66 are reset. Gates 72 and 48 associated with the clutch flip-flop connected to the pusher 29 and the card reader alarm are enabled. The stop flip-flop 54 under certain mode instructions is also set so that only one card will be read. The card reader clutch 21 is then energized by the clutch flip-flop 47 and a card is moved toward the reading station 19.

After approximately 20 milliseconds delay, while the card is moving into the reading station, the leading edge of the card is detected at the reading station 19 by the absence of light at the photocells.

Some time after this, a pusher pulse generated by the movement of the clutch or in some other suitable manner is received and the pusher is actuated to move the card through the reading station 19. This occurs approximately 1.3 milliseconds after the leading edge of the card has been detected, approximately 1.3 milliseconds after the pusher pulse has been received. Four columns of the card pass over the read station before a feed roller 90, shown in FIG. 1, engages the card. Means (not shown) are provided for synchronizing the reading of these four columns and to generate synchronizing strobes or pulses, one for each column passing over the reading station 19. When the leading edge of the fifth column is detected by means (not shown), a signal is generated to switch the card reader to a suitable timing synchronizing system. At this time, clutch flip-flop 47 is reset. A timing disc or other suitable means is utilized to generate sixteen timing pulses between the leading edge of one column and the leading edge of the next column. A counter is provided to count the timing strobes or pulses and to recycle after sixteen pulses have been counted. When six pulses have been counted, the center of a given column to be read is approximately over the center of the slots at the reading station 19. The next timing pulse causes a signal to be transmitted to the data processor for synchronizing the transfer of data. When the leading edge of the next column to be read passes the first edge of the slots at the reading station, the counter recycles to zero in response to a timing signal from the timing device. Reference is made to United States Patent application, Serial No. 175,873, heretofore identified, for a description of a suitable timing means which will provide signals for the timing and synchronizing logic in block 60.

When the center of a hole in column 1 is under the photocells at the reading station 19, the strobe timing mechanism in the card reader will set a priority request flip-flop in the timing and syinchronization logic 60 and a priority request will be transmitted to the priority control logic 18 of the data processor 14 for reading into the data processor the first column of the card. When priority is granted, the information read in column 1 of the card will be gated through the data gates 79 and either the decimal gates 41 or through the binary gates 43 to memory 13 of the data processor 14.

If the information being read is in the 12-row binary mode (Read Card Full), the three bit counter 66 will be used to read the information from only one column in memory register 70 before it is read into a given memory location.

If the information being read is in the decimal mode (Read Card Decimal), the three bit counter 66 will be used to hold the information from three columns in the memory register 70 before the information is read into a given memory location. Before the decimal information is read into memory; however, it is converted to the binary coded decimal mode as explained before by the logic in a suitable encode matrix 80, well known in the art.

Reference is made to the publication entitled, "Digital Computer Components and Circuits," by R. K. Richards, published by D. Van Nostrand Company, Inc., in November 1957 and particularly to the section Diode Matrices on pages 56–60 for a description of known matrix encoding techniques.

The encode matrix will convert the information received from the reading station 19 into binary coded decimal 6-bit configurations for application to decimal gates 48 where it is gated into memory by the three bit counter 66.

If the information being read is in the 10-row binary mode (Read Card Binary), flip-flops FF1 and FF2 of the three bit counter 66 will be used to control the information flow from two columns in the binary card to memory register 70. Positioning of the twenty bits read from two columns in the binary card to register is accomplished in a manner similar to the positioning of three columns of a decimal card to register 70.

After eighty columns have been read in either the binary or decimal mode, special timing is provided as described heretofore to store special indicator bits in memory to signify end of card or last card in the reader, or invalid character read.

The strobe generating means will count a normal column time for a fictitious column eight-one. At the end of the priority pulse for column eighty-one, a false leading edge signal is provided to reset a counter in the strobe or timing pulse generating means. This means that a fictitious column eighty-two will be detected 600 microseconds after column eighty-one instead of the normal column time of 1.75 milliseconds. This is necessary since three fictitious columns on the card and one off the card (column 84) must be detected and written into memory after column eighty.

The reason for the extra columns counted and placed in memory for the various types of card read has been explained heretofore. It is sufficient to note here, however, that the synchronization word placed in one of these fictitious columns contains signal bits indicating that the last card in the hopper was read, the end of a card, etc.

If a Read Card Mixed instruction was decoded, the card would be read in the decimal mode in the same manner as described for the Read Card Decimal mode. However, if punched holes are read in rows 7 and 9 of column 1, the card is then read in the binary mode as described.

The invention has been explained in detail with reference to punch cards; however, any suitable medium or vehicle including punch cards bearing information in one or more codes may be read. The signals representing characters may be recorded as one or more discrete indicia in columns oriented transversely to the length of the information bearing object.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for reading information from a stack of punched cards having information in various codes stored theron in spaced columns, the combination comprising: a reading station for translating information from respective rows of a card being read column by column as the card is fed past said reading station, means for feeding the cards past said reading station, a first means for controlling the transfer of coded information read from the cards in the decimal mode, a second means for controlling the transfer of coded information read from the cards in the binary mode, a third means operable upon energization of the system for effecting a transfer of information by said first means, and a fourth means coupled to said reading station for transmitting a signal upon the reading of a possible given condition of a card for rendering ineffective said third means for the reading of said card and effecting a transfer of information read from said card by said second means.

2. In a system for reading information from a stack of punched cards having information in various codes stored thereon in spaced columns, the combination comprising: a reading station for translating information from respective rows of a card being read column by column, means for providing relative movement between said reading station and the card whereby said reading station senses the information recorded on the card, a first gate for controlling the transfer of coded information read from the cards in the decimal mode, a second gate for controlling the transfer of coded information read from the cards in the binary mode, a first means operable upon energization of the system for effecting a transfer of information read from the cards through said first gate, and a second means coupled to said reading station for transmitting a signal upon the reading of a possible given condition in a predetermined column of a given card for disabling said first gate and for effecting a transfer of information from said given card through said second gate.

3. In a system for reading information from a stack of intermixed binary and decimal coded punched cards having information stored thereon in uniformly spaced columns, the combination comprising: a reading station for translating information signals from respective rows of a card being read column by column as the card is fed past said reading station, means for feeding the cards past said reading station, a first gate for controlling the transfer of information signals read from the binary cards, a second gate for controlling the transfer of information signals read from the decimal cards, a first means operable upon energization of the system for effecting a transfer of information signals through one of said gates, and a second means coupled to said reading station for transmitting a signal upon the reading of a possible given punch condition in column 1 of the cards for disabling said one of said gates and for effecting a transfer of information signals through the other of said gates.

4. In a system for reading information from a stack of intermixed punched cards, the combination comprising: a plurality of intermixed binary and decimal punched cards having information stored thereon, a reading station for translating information signals from a card being read as said card is fed past said reading station, means for feeding said cards past said reading station, a first means for controlling the transfer of information signals read from the decimal cards, a second means for controlling the transfer of information signals read from the binary cards, a third means operable upon energization of the system for effecting a transfer of information signals by said first means, and a fourth means coupled to said reading station for transmitting a signal upon the reading of a possible given condition of a card being read for rendering ineffective said third means and effecting a transfer of information signals from that card by said second means.

5. In a system for reading information from a stack of intermixed binary and decimal coded punched cards having information stored thereon in uniformly spaced columns, the combination comprising: a plurality of intermixed binary and decimal coded punched cards, a reading station for translating information from respective rows of a card being read column by column as said card is fed past said reading station, means for feeding said cards past said reading station, a first gate for controlling the transfer of information read from said binary cards, a second gate for controlling the transfer of information read from said decimal cards, a first means operable upon energization of the system for effecting a transfer of information through one of said gates, and a second means coupled to said reading station for transmitting a signal upon the reading of a given punch condition in column 1 of said cards for disabling said one of said gates and effecting a transfer of information through the other of said gates.

6. In a system for reading information from a stack of intermixed binary and decimal coded punched cards wherein each card has information stored thereon in spaced columns and transferring the information read to a memory, the combination comprising: a reading station for translating information from respective rows of a given card being read column by column as the given card is fed past said reading station, means for providing relative movement between said reading station and the cards whereby said reading station senses the information recorded on the card, a memory for storing information read from the card, a first gate for controlling the transfer of coded information read from said decimal cards to said memory, a second gate for controlling the transfer of information read from said binary cards to said memory, a first means operable upon energization of the system for effecting a transfer of information through said first gate, and a second means coupled to said reading station for transmitting signals upon the reading of a given punch condition in column 1 of the cards for disabling said first gate and effecting a transfer of information through said second gate to said memory.

7. In a system for reading information from a stack of intermixed binary and decimal coded punched cards having information stored thereon in uniformly spaced columns and transferring the information to a storage device, the combination comprising: a reading station for translating information from respective rows of a card being read column by column as the card is fed past said reading station, means for feeding the cards past said reading station, a device for storing information read from the card, a first means for controlling the transfer of information read from the binary cards to said device, a second means for controlling the transfer of information read from the decimal cards to said device, a third means operable upon energization of the system for effecting a transfer of information by one of said first and second means, a fourth means coupled to said reading station for transmitting a signal upon the reading of a possible given condition of the cards for rendering ineffective said third means and effecting a transfer of information through the other of said first and second means to said device, and means for generating and storing in said device a signal indicating the reading of said given condition.

8. In a system for reading information from a stack of intermixed binary and decimal coded punched cards having information stored thereon in uniformly spaced columns and transferring the information read to a memory device of a data processor, the combination comprising: a plurality of intermixed binary and decimal coded punched cards, means for producing a sequence of electric signals representing a computer program for controlling the sequential processing of said cards, a reading station including a plurality of electric means for translating information from respective rows of a card being read column by column as said card is fed past said reading station, means controlled by said sequence of electric signals for feeding said cards past said reading station, a memory device for storing information read from said cards, a first gate interconnecting said reading station and said memory device for controlling the transfer of information read from said binary cards, a second gate interconnecting said reading station and said memory device for controlling the transfer of information read from said decimal cards, means coupled to said first and second gates and responsive to said sequence of electric signals for enabling one of said gates and disabling the other of said gates upon the movement of each card to said reading station, means coupled to said reading station for generating a signal upon the reading of a given condition in a predetermined column of said card for disabling said one of said gates and enabling the other of said gates, timing means coupled to said reading means for generating signals adapted to be employed to effect a transfer of information through said enabled gate into said memory device, and means for generating and storing in said device a signal indicating the reading of said given condition.

References Cited

UNITED STATES PATENTS

| | | | |
|---|---|---|---|
| 2,967,664 | 1/1961 | Ress | 235—61.6 |
| 3,033,449 | 5/1962 | Quinn et al. | 235—61.11 |
| 3,248,522 | 4/1966 | Burch et al. | 235—61.11 |

MAYNARD R. WILBUR, *Primary Examiner.*

DARYL W. COOK, *Examiner.*

T. J. SLOYAN, *Assistant Examiner.*